May 12, 1970 E. A. WASHBURN 3,512,010

SWITCHING CIRCUIT WITH HYSTERESIS

Filed Sept. 25, 1967

United States Patent Office 3,512,010
Patented May 12, 1970

3,512,010
SWITCHING CIRCUIT WITH HYSTERESIS
Ernest A. Washburn, Fairport, N.Y., assignor to Sybron Corporation, a corporation of New York
Filed Sept. 25, 1967, Ser. No. 670,337
Int. Cl. H03k *17/60*
U.S. Cl. 307—218 20 Claims

ABSTRACT OF THE DISCLOSURE

First, second and third transistors are connected to respective voltage dividers, such that if the voltages across the dividers are large enough the transistors conduct. Two of the transistors are connected to the divider of the third such as to prevent the third from firing if either of the transistors conduct. One of the two is arranged so that the voltage required to fire it is larger than the voltage required to fire the other of the two. The third transistor is arranged so that its conduction prevents the said other of the two transistors from conducting. A variable source of firing voltage is connected across the dividers of the said transistors. A fixed source of firing voltage is connected across the voltage divider of the third transistor, and will cause the latter to conduct provided that neither of the other two transistors are conducting. Consequently, when the third transistor is conducting, the voltage of the variable voltage source must fire the said one of the two transistors in order to make the third transistor cease conducting. On the other hand, if the third transistor is not conducting, the voltage of the variable voltage source must drop low enough to stop the said other of said two transistors from firing in order to cause the third transistor to conduct. If non-conduction of the third transistor results in turning a switch, or the like, on, and conduction thereof results in turning said switch off, switch-on occurs at a higher value of the variable voltagee than switch-off, or in short, hysteresis.

In the application of electronic circuits it is frequently necessary to convert an analogue signal to an off-on or switching type of signal. Many different circuits have been devised to perform this function. All of these circuits have an input-output like that shown in FIG. 1, i.e., the output $E_{out}$ turns on and off at the same input $E_{in}$ level. However, for some applications such an input-output characteristic is not satisfactory. A more desirable input-output characteristic would be similar to that shown in FIG. 2. In this case, hysteresis has been introduced, i.e., turn-on and turn-off occur at different input levels.

The property illustrated in FIG. 2 is exhibited by a great variety of devices including electromechanical relays and as well, a great variety of otherwise disparate devices having switch-like behavior. Thus, it has been proposed to introduce hysteresis by means of four-layer or Shockley diodes, or of simulated four-layer diodes. A four-layer diode produces hysteresis due to the fact that it requires a certain voltage across its terminals to turn the device on. As the device turns on, a certain minimum current must pass through it to drive it into the conducting state. Once the four-layer device is conducting, the voltage across its terminals falls to a much lower value and the current in the circuit is dependent on the other components. In order to restore the four-layer diode to its non-conducting state, the current through it must be reduced to a magnitude less than a value known as the holding current which is determined by the construction of the four-layer diode.

The use of commercially available four-layer diodes to introduce hysteresis is impractical or impossible because the firing voltages are too high, fairly large initial currents are necessary to turn them on reliably, the holding currents are quite small and the amount of hysteresis is unpredictable, for firing voltage and the holding current vary from unit to unit. Using transistors, simulated four-layer diodes can be designed to have consistent firing voltage and holding current from unit to unit and to have firing voltages which are not impractically high. However, in a simulation of a four-layer diode, too little or no hysteresis can be attained with an acceptably low level of initial current and an acceptably high level of holding current.

In the present invention, a switching circuit is provided in which the hysteresis is purely a property of the circuit. While the circuit uses switching elements, the desired hysteresis is obtained independently of the natural hysteresis of the individual elements in readily predetermined amount. Further, while the preferred form of the invention uses commercial transistors as switches, problems involving initial current and holding current do not arise. In the ideal, perfect switches (i.e., without hysteresis, etc.) would be used. As a practical matter, in the present invention, it is only necessary that hysteresis of individual elements be of such order as not to affect significantly the circuit hysteresis.

According to the invention, a pair of switches are provided, one of which switches at a lower level of switching signal than the other switch but has a holding circuit which prevents it from switching. The holding circuit, however, is arranged to be disabled if either or both the switches switch. Switching signal applied to both switches, therefore, has to attain a level high enough to switch said other switch, and when it does switch, so does the said one switch, since the holding circuit has been disabled. If switching signal level now drops below the level for switching said other switch, the said one switch will remain switched unless switching signal drops below the aforesaid lower level, upon which the holding circuit reinstates its control over the said one switch. If switching signal level increases again, again the larger level must be reached before anything switches again. The final effect is represented by the state of the holding circuit. Thus, it is in effect until the higher level of switching signal is reached, but after this, it is out and cannot return until switching signal drops below the lower level, the difference between these levels representing the desired hysteresis.

Figure 3:
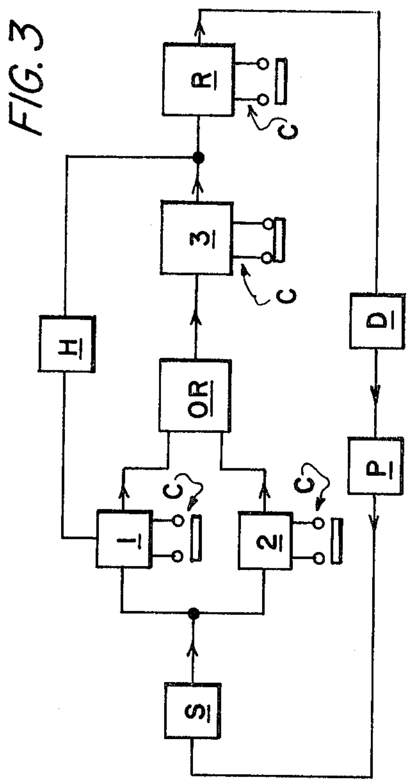
FIG. 3 is a diagram of a switching arrangement according to the invention and providing the switch action of FIG. 2.

In FIG. 3, the switching arrangement is shown more or less divorced from specific structure, though for simplicity and convenience, the arrangement will be described in terms of conventional electromechanical switches wherein mechanical contacts open or close in response to switching signal of sufficient level. Thus, switches 1 and 2 may be normally open switches, that is, each has a set of contacts C that are open unless a switching signal is applied to the switch, in which case the contacts close. Switch 3 may be normally closed, i.e., it has a set of contacts C that remain closed unless switching signal is applied to the switch, in which case the contacts then open.

Switching signal source S applies switching signal to each of switches 1 and 2 simultaneously, and ultimately will control the action of a relay R, which is shown as just another switch, one having its contact set C normally open. However, the terminological difference is made since the relay R represents the entity for which the remainder of the circuitry provides the hysteresis action of FIG. 2. Characteristically, such entity would include circuitry and/or mechanism which operate to produce switching phenomena, but not necessarily.

In any event, the normally-on state of switch 3 maintains the normally-open state of relay R. At this time, this state of switch 3 maintains a hold circuit H in a state preventing switch 1 from going into the on condition. Otherwise, switches 1 and 2 are set to turn on at different switching levels such that, but for circuit H, switch 1 would turn on before switch 2, were switching signal to increase from below a switch-operating level to one high enough to operate switch 2. An OR circuit provides for operating a switch 3 to its open state if either of switches 1 and 2 is on. When so operated, switch 3 turns relay R on and, as well, disables the circuit H. Hence, if source S changes switching signal level from below a switch operating level to above the level required to operate switch 2, switch 1 will remain off. However, switch 3 will turn the relay on and disable circuit H, thereby allowing switch 1 to turn on. If switch signal now decreases to just below the level required to keep switch 2 on, switch 1 will remain on, since the circuit H has been disabled. Accordingly, switch 1 does not turn off until switching signal drops to a level lower than that which was high enough to turn switch 2 on in the first place. Relay R therefore remains on until switching signal drops below the last-mentioned level. As both of switches 1 and 2 are off now, switch 3 now turns relay R off again. In short, relay R turns on only when switching signal increases to a given level. However, it will not turn off again until switching signal drops to a level below the said given level, which is the result desired. This is a hysteresis-like behavior which finds use in the operation of motor control systems. Thus, suppose relay R's contact set C, when closed, completes the power circuit of a motor, thereby causing the motor to run, whereas it opens its contact set to stop the motor. Accordingly, it is evident that if the motor is off, a given level of switching signal from source S is required to start the motor or other control device D. However, once on, the switching signal must decrease to a second given value that is less than the first said given value, before the power circuit of the motor will open. If, as is often the case, the effect of running of the motor is used to decrease the switching signal value as a function of some effect, produced or modified by running of the motor, the hysteresis action prevents the switching signal from assuming a marginal value, which more or less continuously fluctuates between motor stopping and motor starting states of relay R to produce such undesirable phenomena as "chattering" of the relay contacts, heating of the motor windings, etc. Thus, suppose that the running of the motor D affects the condition of some process P and this condition influences the source S to produce its signal with a sense of variation opposite to the sense in which the condition is affected. Thus, one might suppose the source S to produce a signal that increases as the condition changes in some given sense. Eventually, the signal will increase enough to turn the motor D on, which in turn makes the condition change in the opposite sense thereby causing source signal to decrease. Eventually, now, the signal will decrease enough to turn the motor off. Commonly, the motor D can reverse the course of the condition by running in reverse. In these cases, the switching arrangement will be duplicated, the one thereof controlling forward and the other controlling reverse. Systems of these types are well known in the art, and since how to apply my invention thereto will be obvious to those skilled in the art, it is unnecessary to consider such use of my invention in any further detail.

Preferably, the above-described system is realized in switching circuitry having no movable parts. While vacuum tube circuitry could be used, according to the present invention, the preferred form of switching circuit is embodied in solid state circuitry, such as shown in FIG. 4.

Figure 1:
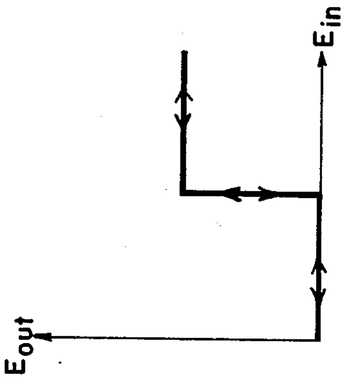
FIGS. 1 and 2 represent switching actions.
Figure 2:
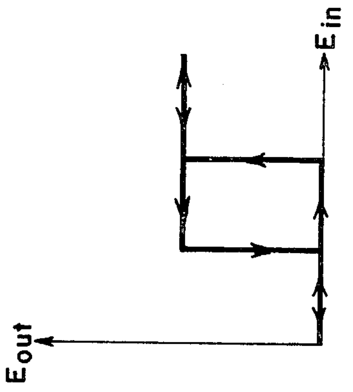
Figure 4:
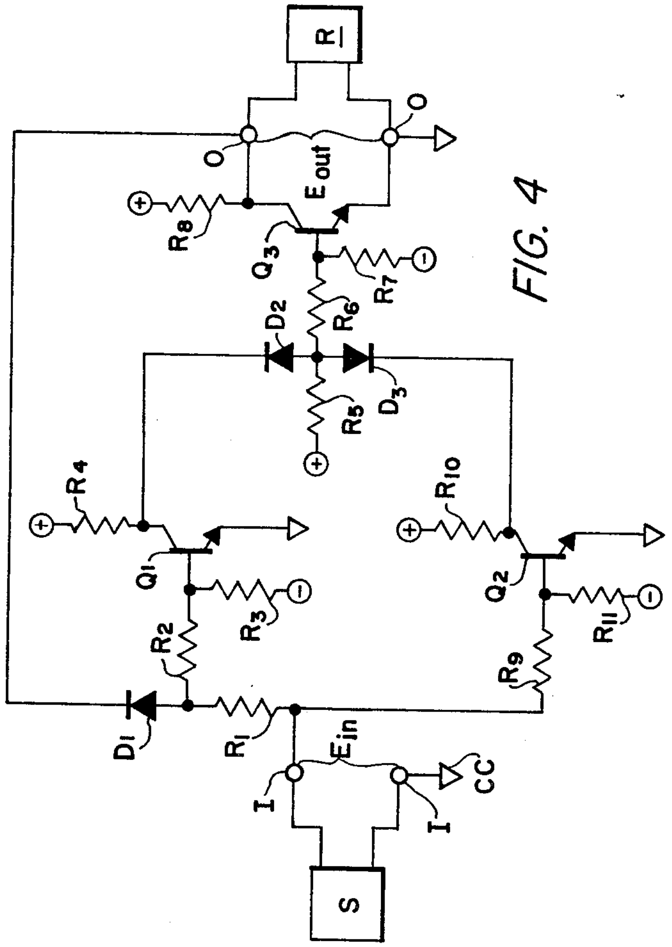
FIG. 4 is a solid state circuit form of the invention shown in FIG. 3.

The circuit of FIG. 4, which does not have the previously mentioned problems of real or simulated four-layer diodes, receives an analogue voltage, $E_{in}$, and converts it to a switched output voltage, $E_{out}$, having the desired hysteresis as shown in FIG. 2.

Proper operation of this circuit is dependent on the fact that resistors R1, R2 and R3 are chosen so that transistor Q1 is turned off for all values of input voltage equal to or less than the input voltage, $E_{in\ on}$, at which it is desired that the output of the circuit be turned on. Proper operation is also dependent on the fact that resistors R9 and R11 are selected so that transistor Q2 is turned on for all values of input voltage equal to or greater than the input voltage $E_{in\ off}$, at which it is desired that the output of the circuit be turned off.

Assume a value of $E_{in}$ large enough so that the base of transistor Q1 is held at a positive potential by voltage divider formed by R1, R2 and R3, and that the base of transistors Q2 is held at a positive potential by the voltage divider formed by R9 and R11. Both transistors Q1 and Q2 will be turned on and their collectors will be very nearly at ground potential through a very low impedance. Diodes D2 and D3 will then be forward biased and conducting. R5 is a high resistance compared to the impedance of the diodes and the transistors, hence, the junction of D2, D3, R5 and R6 will be clamped at a small positive potential. The voltage divider formed by R6 and R7 will then hold the base of transistor Q3 negative. Q3 will then be off and $E_{out}$ will be +24 volts through R8, across the output terminals O. As $E_{in}$ decreases, it will reach a point at which the base of Q2 is not held sufficiently positive for Q2 to be turned on. At this point, Q2 will turn off and its collector go to +24 volts through R10. D3 will now be back biased. However, nothing further happens at this time, for the junction of D2, D3, R5 and R6 is still clamped by Q1, thereby holding Q3 off. As $E_{in}$ continues to decrease, it will reach a point at which the base of Q1 is not held sufficiently positive for Q1 to be turned on. At this point, Q1 will turn off and its collector go to +24 volts through R4. Diodes D2 and D3 are now both back biased. The voltage divider formed by R5, R6 and R7 now causes the base of Q3 to go positive. Q3 now turns on causing $E_{out}$ to drop to very near ground potential. Diode D1 is now forward biased and clamps the junction of D1, R1 and R2 at a small positive potential with respect to circuit common (which is indicated by inverted triangles, as at CC, for example). Since the source S of $E_{in}$ has one side connected to one of the input terminals and its other side to the other terminal I, the resistance of resistor R1, the forward resistance of D1, and the resistance between emitter and collector of Q3 are connected in series across the source, and the greater part of $E_{in}$ is dropped across R1, since the latter resistances are now small compared to R1. Also, the emitter-collector resistance of Q3 is now small compared to R8, so that the positive bias applied by R8 is dropped mostly across R8.

If $E_{in}$ now increases, Q1 will continue to be held off due to the clamp via D1, and the output of the circuit will remain near ground, that is to say, on. As $E_{in}$ continues to rise, it will sooner or later reach a value at which the base of Q2 will be positive enough to turn transistor Q2 on. When Q2 is on, its collector goes nearly to ground potential, thus forward biasing D3 and clamping the junction of D2, D3, R5 and R6 at a small positive voltage. This causes the base of Q3 to go negative. Q3 then turns off and $E_{out}$ returns to +24 volts, through R8, the off condition. D1 is now back biased, or, in effect, disconnected from circuit common, which results in unclamping the junction of D1, R1 and R2. This junction now takes on a voltage determined by R1, R2 and R3 in series. The base of Q1 is now under the control of $E_{in}$ which is now great enough to cause Q1 to immediately turn on. The original conditions have now been restored and the circuit is ready for another input cycle.

The generation of hysteresis in this circuit is dependent on Q1 and Q2 turning off at different voltages, and on the latching action of diode D1. The turn-off voltage of Q1 is set by selection of R1, R2 and R3, and the turn-off voltage of Q2 is set by selection of R9 and R11. The magnitude of the hysteresis can be adjusted by varying the magnitude of one or the other or several of R1, R2, R3, R9 and R11.

One particular advantage of the circuit of FIG. 3 is that there are regenerative effects that reinforce the switching of Q3. Thus, when Q3 switches off in response to Q2 turning on, Q3 causes Q1 to come on, which reinforces the action of Q2. On the other hand, with Q3 and Q2 off, Q1 turning off causes Q3 to come on, thereby forward-biasing D1, which in turn turns Q1 off harder. This means that $E_{in}$ can, on increase, fluctuate around the level needed to turn Q2 on and, on decreasing, fluctuate around the level needed to turn Q1 off, without such fluctuations affecting the switching, for once turn-on or turn-off begins, the regenerative effect quickly takes control. That is, $E_{in}$ can now deviate to a level which would not itself support switching, yet the switching will go to completion.

The transistors of the circuit of FIG. 4 may all be 2N3904's, and the diodes all 1N914's. Inverted triangles identify circuit common, i.e., zero volts with respect to the positive and negative supply terminals (indicated by the circled minus and plus signs). In one specific example, the transistors were each 2N3904, and the diodes each 1N914, and the positive and negative supplies were plus and minus 24 volts D.C., respectively. Resistors R3, R4, R8, R10 and R11 were each 100,000 ohms, R1, R2, R5, R6, R7 and R9 were 4700, 5100, 68,000, 22,000, 220,000, and 24,000 ohms, respectively. $E_{in}$ varied from about zero to 12 volts, D.C. $E_{out}$ was either 24 volts D.C. or less than 0.5 volt D.C. $E_{out}$ switched at $E_{in}=3$ volts, for decreasing $E_{in}$, and switched back at $E_{in}=6.5$, for increasing $E_{in}$.

The specific values given above are, of course, for illustration purposes only, and are not to be regarded as limiting. Indeed, considering the invention from the broader point of view of the bistable character of its elements, it will be observed that the terms "on," "off," "open," "closed," "contacts," etc., while heuristically convenient, imply structural specifics that are not critical except where the entity having those specifics is explicitly involved. Thus, a transistor obviously does not have a contact set involving movable parts such as the manner of drawing sets C indicates. Even more, "off" and "on," and the like, are broadly interchangeable. For example, in FIG. 3, the workings of the scheme shown here would not be changed in any significant way by reason of making switch 3 a "normally-open" switch, since it is obvious that switch 3 could be arranged to have to turn on in order to disable circuit H and to turn relay R on. Again, relay R could be arranged to start the motor by opening its contact set C and to stop it by closing it. Furthermore, the choices of "off" and "on," made in FIG. 3 reflect the off-on configurations of the circuit of FIG. 4, which in turn arise out of circuit details. In particular, it will be observed from inspection of FIG. 2, that in the system of FIG. 3, one has the choice of arranging the system so that control device D is operative on high levels of $E_{in}$ and inoperative on low-levels, or vice versa, a situation common in process control practice. Those skilled in the art will understand these considerations, and that many modifications based thereon are both obvious and within the scope of my invention.

Having described my invention in accordance with the requirements of Title 35, U.S.C., I claim:

1. A switching arrangement with hysteresis, said arrangement comprising first switch means and second switch means, each said switch means being responsive to switching signal applied thereto to switch from a first state to a second state, each first and second said switch means being in said first state if said switching signal is below a given level, and the said given level for said first switch means being less than the said given level for said second switch means; third switch means, and hold means connected thereto, connecting means connecting said third switch means to said first and second switch means, said connecting means and said third switch means being constructed and arranged such as to cause said hold means to be operative when each said first and second switch means is in its said first state, but such as to cause said hold means to be inoperative when either of said first and second switch means is in its said second state, and also when each thereof is in its said second state; said hold means being connected to said first switch means, and said switch means being constructed and arranged such that said hold means, when operative, prevents said first switching means from switching to its said second state, but that said hold means, when inoperative, allows said first switch means to switch to its said second state; and switching signal applying means adapted to apply switching signal to both of said first and second switch means.

2. The switching arrangement of claim 1, including adjustable means connected to one of said first and second switch means, said adjustable means being adapted to provide for adjustment of one said given level relative to the other said given level.

3. The switching arrangement of claim 2, wherein said switching signal applying means is constructed and arranged to apply switching signal to both said first and second switch means simultaneously, and from a single source of switching signal.

4. The switching arrangement of claim 1, wherein said switching signal applying means is constructed and arranged to apply switching signal to both of said first and second switch means simultaneously, and from a single source of switching signal.

5. The switching means of claim 1, wherein said first switch means is a first transistor arranged to switch in response to voltage applied thereto, said second switch means is a second transistor arranged to switch in response to voltage applied thereto, said switching signal applying means including a circuit constructed and arranged to be connected to a source of switching signal and to provide therefrom a first voltage and a second voltage, each representative of said switching signal, said network being connected to said first transistor to apply said first voltage thereto as switching voltage, and said network being connected to said second transistor to apply said second voltage thereto as switching voltage.

6. A control system including the switching arrangement of claim 1, and further including a control device having a first state in which it causes change in the level of said switching signal and having a second state in which it does not cause such change; said control device being connected to said third switch means, and said third switch means being arranged to cause said control device to be in one of said states when said hold means is inoperative, but to cause said control device to be in the other of said states when said hold means is operative.

7. A control system including the switching arrangement of claim 2, and further including a control device having a first state in which it causes change in the level of said switching signal and having a second state in which it does not cause such change; said control device being connected to said third switch means, and said third switch means being arranged to cause said control device to be in one of said states when said hold means is inoperative, but to cause said control device to be in the other of said states when said hold means is operative.

8. A control system including the switching arrangement of claim 3, and further including a control device having a first state in which it causes change in the level of said switching signal and having a second state in which it does not cause such change; said control device being connected to said third switch means, and said third switch means being arranged to cause said control device to be in one of said states when said hold means is inoperative, but to cause said control device to be in the other of said states when said hold means is operative.

9. A control system including the switching arrangement of claim 4, and further including a control device having a first state in which it causes change in the level of said switching signal and having a second state in which it does not cause such change; said control device being connected to said third switch means, and said third switch means being arranged to cause said control device to be in one of said states when said hold means is inoperative, but to cause said control device to be in the other of said states when said hold means is operative.

10. A control system including the switching arrangement of claim 5, and further including a control device having a first state in which it causes change in the level of said switching signal and having a second state in which it does not cause such change; said control device being connected to said third switch means, and said third switch means being arranged to cause said control device to be in one of said states when said hold means is inoperative, but to cause said control device to be in the other of said states when said hold means is operative.

11. A switching arrangement with hysteresis, said arrangement including a first switch means having first input means for applying one side of a voltage source thereto so as to switch said first switch means from a first state to a second state, for a first given voltage level of said voltage source, a diode connected to said input means in said diode's forward direction with respect to said one side of said voltage source; second switch means having second input means for applying said one side of said voltage source thereto so as to switch from a first state to a second state, for a second given voltage level of said voltage source, said second given level being higher than said first given level; third switch means switchable from a first state to a second state, said third switch means being responsive to the other said switch means, when either or both thereof is in the said second state or states, such as to be in said second state, but otherwise being in said first state, said third switch means being arranged, when in said first state, to connect said diode to the other side of said voltage source such as to forward bias said diode and clamp said first input means at a voltage level not high enough to switch said first switch means to said second state, said third switch means being arranged, when in said second state, to disconnect said diode from said other side of said voltage source, such as to unclamp said first input means.

12. The switching arrangement of claim 11, wherein one of said input means is adapted to be adjusted such as adjust one said given level relative to the other said given level.

13. The switching arrangement of claim 12, wherein both said input means have an input terminal in common for connection to said one side of said voltage source.

14. The switching arrangement of claim 11, wherein both said input means have an input terminal in common for connection to said one side of said voltage source.

15. The switching arrangement of claim 11, wherein said first switch means is a first transistor arranged to switch to said second state in response to switching voltage applied to said first input means, said third switch means is a further transistor, said first state for said further transistor being conducting between a pair of its electrodes in its said first state but non-conducting between said electrodes in its said second state, one of said electrodes being connected to said other side of said voltage source, and the said diode being connected between said one side of said voltage source and the other of said electrodes.

16. A control system including the switching arrangement of claim 11, and further including a control device having a first state in which it causes change in the level of the voltage of said voltage source and having a second state in which it does not cause such change; said control device being connected to said third switch means, and said third switch means being arranged to cause said control device to be in one of said states when said first input means is clamped, but to cause said control device to be in the other of said states when said first input means is unclamped.

17. A control system including the switching arrangement of claim 12, and further including a control device having a first state in which it causes change in the level of the voltage of said voltage source and having a second state in which it does not cause such change; said control device being connected to said third switch means, and said third switch means being arranged to cause said control device to be in one of said states when said first input means is clamped, but to cause said control device to be in the other of said states when said first input means is unclamped.

18. A control system including the switching arrangement of claim 13, and further including a control device having a first state in which it causes change in the level of the voltage of said voltage source and having a second state in which it does not cause such change; said control device being connected to said third switch means, and said third switch means being arranged to cause said control device to be in one of said states when said first input means is clamped, but to cause said control device to be in the other of said states when said first input means is unclamped.

19. A control system including the switching arrangement of claim 14, and further including a control device having a first state in which it causes change in the level of the voltage of said voltage source and having a second state in which it does not cause such change; said control device being connected to said third switch means, and said third switch means being arranged to cause said control device to be in one of said states when said first input means is clamped, but to cause said control device to be in the other of said states when said first input means is unclamped.

20. A control system including the switching arrangement of claim 14, and further including a control device having a first state in which it causes change in the level of the voltage of said voltage source and having a second state in which it does not cause such change; said control device being connected to said third switch means, and said third switch means being arranged to cause said control device to be in one of said states when said first input means is clamped, but to cause said control device to be in the other of said states when said first input means is unclamped.

References Cited

UNITED STATES PATENTS

| | | | |
|---|---|---|---|
| 3,050,642 | 8/1962 | Rogers et al. | 307—235 XR |
| 3,106,646 | 10/1963 | Carter | 307—218 |
| 3,246,080 | 4/1966 | Ritchey | 307—235 XR |
| 3,421,018 | 1/1969 | Martin | 307—218 |
| 3,445,680 | 5/1969 | Foster et al. | 307—237 XR |
| 3,453,448 | 7/1969 | Close | 307—235 |

JOHN S. HEYMAN, Primary Examiner

S. T. KRAWCZEWICZ, Assistant Examiner

U.S. Cl. X.R.

307—235, 237, 261, 317